United States Patent
Yones et al.

(10) Patent No.: US 11,265,518 B2
(45) Date of Patent: Mar. 1, 2022

(54) CAMERA SYSTEM MONITOR FOR SHOPPING CART BOTTOM SHELF

(71) Applicants: Dale Lee Yones, Longmont, CO (US); Scott David Dalgleish, Boulder, CO (US); Craig W. Moyer, York, PA (US)

(72) Inventors: Dale Lee Yones, Longmont, CO (US); Scott David Dalgleish, Boulder, CO (US); Craig W. Moyer, York, PA (US)

(73) Assignee: BOB Profit Partners LLC, York, PA (US)

( * ) Notice: Subject to any disclaimer, the term of this patent is extended or adjusted under 35 U.S.C. 154(b) by 0 days.

(21) Appl. No.: 16/907,566

(22) Filed: Jun. 22, 2020

(65) Prior Publication Data
US 2021/0067746 A1   Mar. 4, 2021

Related U.S. Application Data

(60) Provisional application No. 62/895,468, filed on Sep. 3, 2019.

(51) Int. Cl.
| | |
|---|---|
| H04N 7/18 | (2006.01) |
| G06Q 20/20 | (2012.01) |
| G06K 7/10 | (2006.01) |
| G06F 1/3296 | (2019.01) |
| G06K 9/62 | (2006.01) |
| G08B 7/06 | (2006.01) |
| G06K 9/46 | (2006.01) |
| H04N 5/232 | (2006.01) |
| H04B 1/38 | (2015.01) |
| G06K 9/00 | (2006.01) |

(52) U.S. Cl.
CPC .......... *H04N 7/185* (2013.01); *G06F 1/3296* (2013.01); *G06K 7/10366* (2013.01); *G06K 9/00771* (2013.01); *G06K 9/4604* (2013.01); *G06K 9/4652* (2013.01); *G06K 9/6201* (2013.01); *G06Q 20/203* (2013.01); *G06Q 20/208* (2013.01); *G08B 7/06* (2013.01); *H04B 1/38* (2013.01); *H04N 5/232411* (2018.08); *H04N 7/188* (2013.01)

(58) Field of Classification Search
None
See application file for complete search history.

(56) References Cited

U.S. PATENT DOCUMENTS

| | | |
|---|---|---|
| 7,242,300 B1 | 7/2007 | Konstad et al. |
| 8,740,085 B2 | 6/2014 | Furlong et al. |
| 2003/0142222 A1* | 7/2003 | Hordley ............... G06K 9/4652 348/223.1 |
| 2003/0184440 A1 | 10/2003 | Ballantyne |

(Continued)

*Primary Examiner* — Clifford Hilaire
(74) *Attorney, Agent, or Firm* — Kenneth Altshuler (57) ABSTRACT

A method apparatus are directed to identify items disposed on the bottom shelf of a shopping cart bottom of basket (BoB). Certain aspects envision a distance measurement sensor and computing system connected to the shopping cart. A first set of distance measurements of the bottom shelf when empty is obtained via the distance measurement sensor. Next, at a checkout stand, a second set of distance measurements of the shelf are taken, which can be used to compare with the first set of distance measurements to identify if there is an object on the BoB. An alert can be provided to a checkout attendant if there is an object on the BoB.

18 Claims, 7 Drawing Sheets

(56) References Cited

U.S. PATENT DOCUMENTS

| | | | |
|---|---|---|---|
| 2005/0030160 A1* | 2/2005 | Goren | G06K 19/07733 340/10.5 |
| 2007/0236336 A1* | 10/2007 | Borcherding | H04B 5/0068 340/10.34 |
| 2008/0231431 A1 | 9/2008 | Stawar et al. | |
| 2012/0004769 A1* | 1/2012 | Hallenbeck | G07F 11/62 700/232 |
| 2013/0076491 A1* | 3/2013 | Brandsma | H04B 5/0062 340/10.3 |
| 2018/0039841 A1* | 2/2018 | Richards | G06K 9/00771 |
| 2018/0197218 A1* | 7/2018 | Mallesan | G06K 9/00771 |
| 2018/0284250 A1* | 10/2018 | Bjaerum | G01S 15/8915 |
| 2019/0141797 A1* | 5/2019 | Imai | H05B 6/6447 |
| 2020/0198680 A1* | 6/2020 | Hagen | B62B 5/0096 |

\* cited by examiner

CAMERA SYSTEM MONITOR FOR SHOPPING CART BOTTOM SHELF

CROSS-REFERENCE TO RELATED APPLICATIONS

This application claims priority to and the benefit of U.S. provisional Patent Application No. 62/895,468 entitled: Camera System Monitor for Shopping Cart Bottom Shelf, filed on Sep. 3, 2019.

FIELD OF THE INVENTION

The present embodiments are directed to detecting the presence of one or more items located on the bottom of a shopping cart determined by digital imaging.

DESCRIPTION OF RELATED ART

Customers leaving a store with unpaid items on the bottom rack of a shopping cart, also known as the Bottom of the Basket (BoB), is a chronic problem that amounts to substantial lost revenue for stores. In fact, current estimates are roughly $60,000 of lost revenue per grocery store per year due to items not charged because those items leave the store undetected on the BoB. This is because items on the BoB are commonly not placed on the check-out stand for payment by the checkout attendant and customers may not do so simply by accident or intentionally to pull off a carefully planned theft that if caught can credibly fain plausible deniability. To complicate matters, check-out employees may be hesitant to confront customers about items on the BoB even when they see the items in order to simply avoid confrontation. Another aspect of this problem includes self-check-out stands where there is little oversight by a store employee. Although there are systems that try to solve this problem, none have been effective due to being overly technically complex and over burdensome to maintain. Other concepts ultimately fail to work in practice because cameras or other detectors mounted at the check-out stand produce excessive "false detection" readings, which often confuse BoB items with customer legs and feet. Clearly, when enough false detections waste the time of checkout clerks, the readings are simply ignored. Certain other systems fail in practice due to excessive alignment problems between a cart and a check-out stand detector resulting in unreliable readings.

It is to innovations related to this subject matter that the claimed invention is generally directed.

SUMMARY OF THE INVENTION

The present invention is directed to a one-way or two-way wireless communication between a light optical camera sensor system on a shopping cart and a transceiver and display at a particular "cart read" location.

Certain embodiments of the present invention contemplate a shopping cart comprising: a basket; a shelf connected to the basket, the shelf located under the basket and spaced sufficiently under the basket to support at least one item; at least one visual light camera sensor (hereinafter "camera") connected to the shopping cart, the shelf in a field of view of the camera; a power supply connected to and adapted to power the camera; a shopping cart transceiver that may be connected to and adapted to be powered by the power supply, the shopping cart transceiver comprises an antenna; and a microprocessor, powered by the power supply and connected to the shopping cart transceiver, configured to become fully activated when in an interrogation zone of an interrogation zone transceiver, the microprocessor configured to determine the presence of the item by comparing raw image data or image data processed by the microprocessor from a second image of the shelf with the item against raw or processed data from a first image of the shelf without the item, the first image and the second image obtained by the camera, the first image data retained in non-transitory memory accessible to the microprocessor, the shopping cart transceiver configured to transmit the presence of the item supported by the shelf to the interrogation zone transceiver. Certain embodiments contemplate a battery free transceiver, distance sensor and microprocessor that are inductively powered by radio waves when in the interrogation zone.

Yet, other embodiments of the present invention can therefore comprise a method comprising: providing a shopping cart that possesses a basket, a shelf connected to and located under the basket, a microprocessor, a camera, non-transitory memory, and a shopping cart transceiver; collecting a first raw or processed optical image data of the shelf when empty via the camera; storing the first raw or processed optical image data to the non-transitory memory; collecting a second raw or processed optical image data of the shelf via the camera and microprocessor when within an interrogation zone; comparing the second optical image data with the first optical image data retained in the non-transitory memory; determining a status of whether there is at least one item disposed on the shelf from the comparing step, the status is either an empty status indicating no item disposed on the shelf or a full status indicating at least one item disposed on the shelf; and transmitting the status to an alert system.

Yet further embodiments of the present invention contemplate a method comprising: providing a shopping cart that includes a basket, a shelf connected to and located under the basket, a microprocessor, a camera, non-transitory memory, a power supply, and a shopping cart transceiver, the microprocessor controlling the camera, the non-transitory memory, the power supply, and the shopping cart transceiver; with the microprocessor in an active state, collecting a first optical image data of the shelf when empty via the camera, the active state defined by controlling functionality and power to the camera, the non-transitory memory, and the shopping cart transceiver as well as executing all relevant internal microprocessor functionality; storing the first optical image to the non-transitory memory; transitioning the microprocessor in a sleep state defined by a low-power consuming condition after the storing step; the shopping cart transceiver receiving a wireless signal when in an interrogation zone produced by a checkout station transceiver; waking up the microprocessor from the sleep state to the active state; collecting a second optical image data of the shelf via the camera when within the interrogation zone after the waking up step; comparing the second optical image data with the first optical image data retained in the non-transitory memory via the microprocessor; determining a status of whether there is at least one item disposed on the shelf from the comparing step, the status is either an empty status indicating no item disposed on the shelf or a full status indicating at least one item disposed on the shelf; transmitting the status to a checkout station; and providing notice at the checkout station of the status.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of detecting the presence of one or more items digital cameras/imaging sensors in similar situation as in the bottom of a shopping cart. In what follows, similar or identical structures may be identified using identical callouts.

Certain embodiments of the present invention envision detecting one or more items disposed on the bottom of a shopping cart by way of at least one digital optical camera/imaging sensor located at, or otherwise integrated with, a shopping cart that wirelessly communicates the detection of the element/s to a "cart-read" location, such as at a checkout stand. A digital imaging sensor envisioned herein is not intended to be used to determine distance in an image, but rather a typical two dimensional optical image or processed image data such as a consolidated color spectrum of part or all of the image data whether in the ultra-visual light spectrum (UV), visible, or infrared light spectrum (IR). A digital imaging sensor is not related to a time-of-flight sensor or an ultrasonic sensor or other distance sensors.

Figure 1:
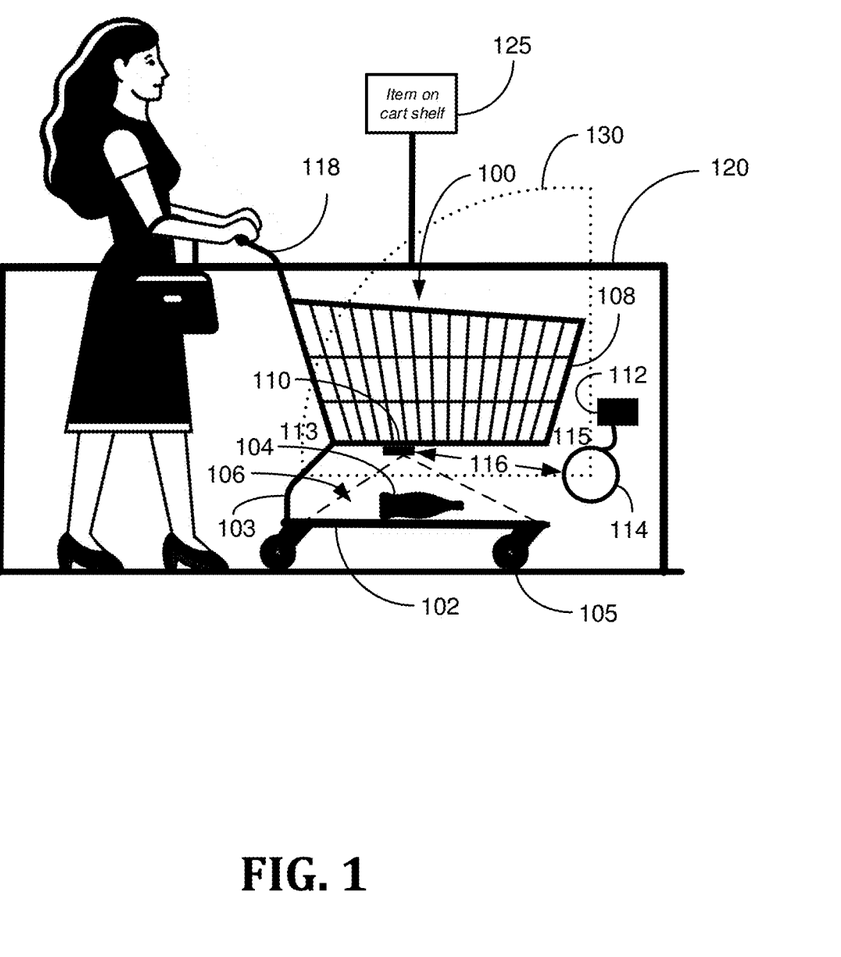
FIG. 1 depicts a block diagram of a checkout stand and shopping cart arrangement consistent with embodiments of the present invention.

FIG. 1 depicts a checkout stand and shopping cart arrangement consistent with embodiments of the present invention. More specifically, the shopping cart 100 generally comprises a basket 108, a shelf 102 connected to the basket 108 by way of a frame 103, a handle 118 used to push the shopping cart 100 and wheels 105 adapted to easily move and navigate the cart 100 across a smooth surface, e.g., the ground. The basket 108 is the primary receptacle for holding items, such as groceries. The shelf 102 is located under the basket 108 and is spaced sufficiently under the basket 108 to support at least one item, generally a larger item, such as a ream of paper towels or a case of soda, for example.

In the present embodiment, at least one image sensing module 110, which comprises an image sensor 208 (shown in FIG. 2), is connected to the shopping cart 100 under the basket 108. The image sensor 208 is positioned so that the shelf 102 is in the field of view 106 of the distance image sensor 208, which in this embodiment is comprised by the cart module 110. Other embodiments contemplate a plurality of image sensors 208 located in other places along the shopping cart 100 which are positioned so that they may collectively view the shelf 102 either from a single location (see FIGS. 6A and 6B) or from multiple locations. For example, one image sensor 208 could be located at the front of the cart 115 and another image sensor could be located at the back of the cart 113 wherein the shelf 102 could be in the field of view for each of the sensors 208 or optionally collectively in the field of view only when both sensors 208 are being used. In the case where the shopping cart 100 comprises a frame assembled from hollow metal tubes or structural beams comprised of other materials such as polymer or polymer based composites. Some embodiments envision one or more image sensors 208 buried in the hollow metal tube/s or structural beams to protect the sensor 208 from damage, for example due to weather, or when multiple shopping carts are nested together, or general rough handling by a person using the shopping cart 100.

Figure 2:
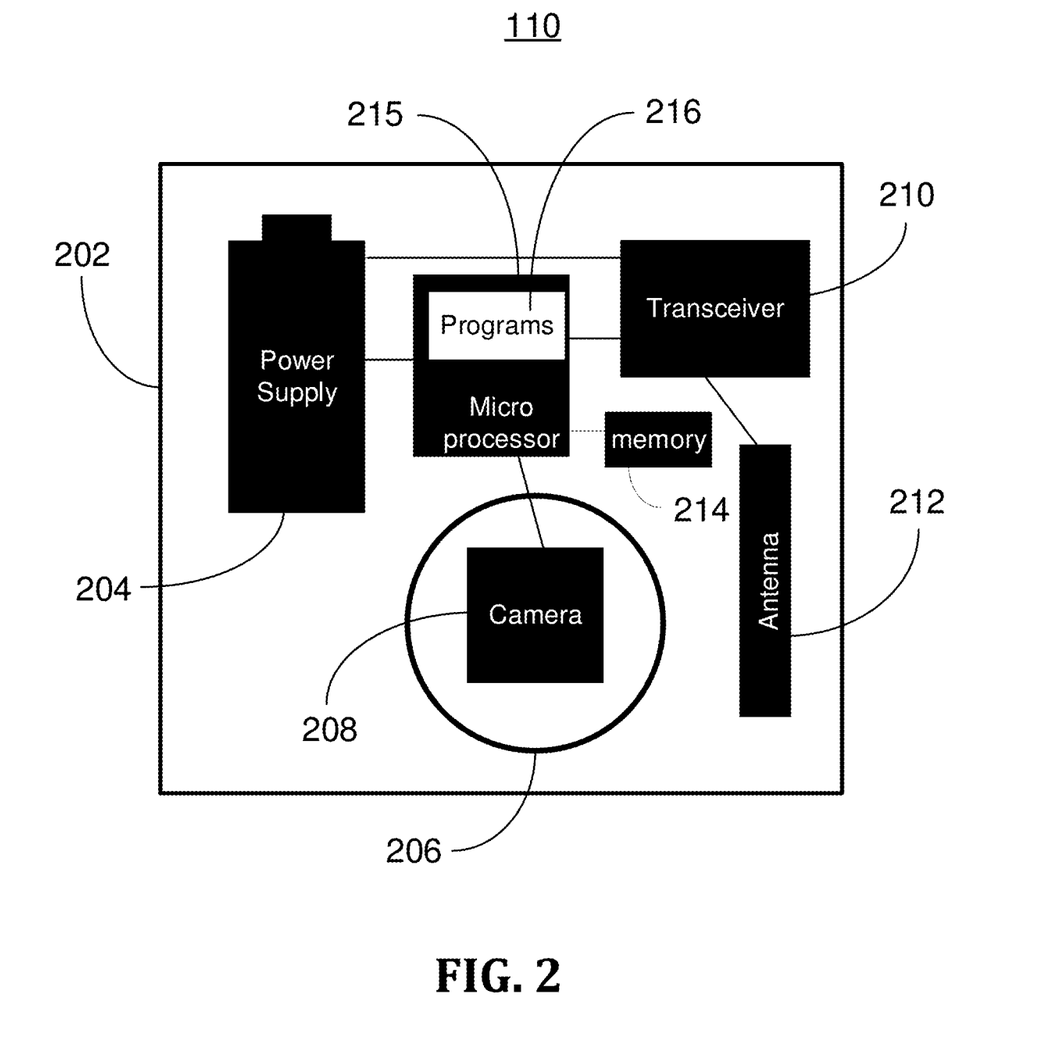
FIG. 2 depicts a block diagram of a distance measuring sensor module 110 consistent with embodiments of the present invention.

FIG. 2 is a block diagram of an image sensor module (cart module) 110 consistent with embodiments of the present invention. The cart module 110 generally comprises an image sensor 208 that is controlled by a microprocessor/controller 215 that possesses the necessary computational elements known to those skilled in the art to execute controlling functions, image processing algorithms, and programs. Electrically and communicatively connected to the microprocessor 215 in addition to the camera 208 are a) storage memory 214 and b) a transceiver 210 and an antenna 212. The antenna 212 is operably connected to a wireless communications circuit (not shown), which may be an integrated circuit known to those skilled in the art. If the cart transceiver 210 needs power, a power supply 204, e.g. a battery, is connected and configured to power the cart transceiver 210, the microprocessor 215 and the distance measuring sensor 208, as shown. Certain embodiments envision power supplied by electromagnetic waves strong enough to induce an electrical current in the antenna 212 powerful enough to drive the cart module 110. Hence, the power supply can be electromagnetic waves that are strong enough to induce current in the cart module 110 via the antenna 212. Certain embodiments contemplate the electromagnetic waves being harvested by an antenna that is not part of the cart module 110 or the shopping cart transceiver, but is possessed elsewhere on the shopping cart 100. All of these components (204, 208, 210, 212, 214 and 215) can be contained in a housing/enclosure 202. The housing 202 provides a window 206 for the camera 208 to freely view the shelf 102. A skilled artisan will appreciate the other necessary electrical components, such as wires, resistors, diodes, RAM, EPROM, wireless communications circuit/s and other specialty circuits, etc. that are necessary to the cart module 110 are not shown for the sake of simplicity. Other embodiments envision one or more of the aforementioned elements depicted in FIG. 2 not being enclosed by the housing 202. While other embodiments envision no housing whatsoever.

The image sensor module 110 is configured and arranged to wirelessly communicate with the interrogation zone module 112 via the transceiver 210 and antenna system 212. The interrogation zone module 112 is referred to herein as the checkout stand module when located at a checkout stand 120 as an illustrative example. Certain embodiments envision different modes of wireless communication when coupled, such as through radio waves, UV light, etc.

Some embodiments contemplate a digital imaging sensor, such as a digital camera 208, that determines if 2-D image characteristics or pixel characteristics of the BoB shelf 102 has changed from an original image or optical properties (using the consistent imaging techniques) of when the BOB shelf 102 was known to be "empty shelf". Various image processing methods may be used to compare images of the known empty BoB with images taken by the cart camera 208. Certain embodiments employ using digital camera electronics selected for simply determining if the shelf is empty, as opposed to attempting to identify specifics about the items on the shelf 102, such as a soda bottle or a box of cereal for example. In this embodiment, the digital imaging sensor 208 only needs to be powered-on for a fraction of a second (in the range of milliseconds) to preserve battery power in the embodiments that use a battery 204.

Figure 3:
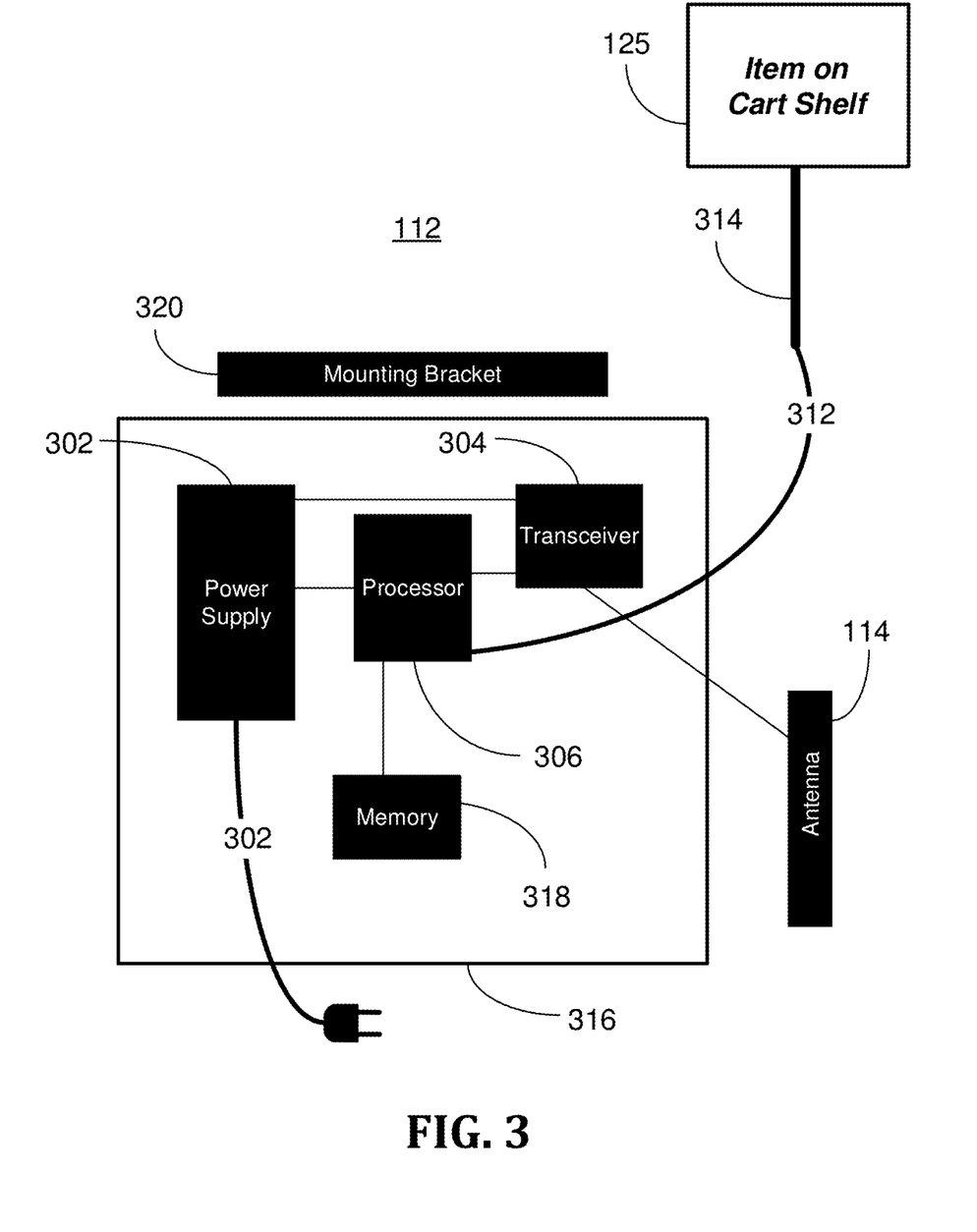
FIG. 3 depicts a block diagram of a checkout stand module embodiment consistent with embodiments of the present invention.

FIG. 3 depicts a block diagram of a checkout stand module embodiment consistent with embodiments of the present invention. As shown, a power supply 302 is directly connected to a checkout stand transceiver 304 and a microprocessor 306. Though embodiments herein refer to a checkout stand transceiver 304 for ease of discussion and consistency, transceiver 304 is not so limited to be at a checkout stand 120. Rather, transceiver 304 is envisioned to be in one or more locations that can be generically referred to as a "cart reader" (around a store or elsewhere). Because the checkout stand module 112 is statically located at the checkout stand 120 (fixedly and immobile mounted to the checkout stand 120), the power supply 302 can be arranged to receive power from an outlet (not shown) by way of a power cord 305. The microprocessor 306 is attached to non-transitory memory 318 adapted and configured to store or otherwise maintain data that is used by the microprocessor 306. The microprocessor 306 is also directly linked to the checkout stand transceiver 304, which is adapted and configured to communicate with the cart transceiver 210 via the checkout stand antenna 114. The microprocessor 306 is further connected to a checkout stand display 125 via a wireline 312. The checkout stand display 125 is mounted to the checkout stand 120 by way of a display stand 314. Certain embodiments envision the checkout stand module 112 being essentially enclosed by a checkout stand module housing 316 and mounted to the checkout stand 120 via a mounting bracket 320. The aforementioned checkout stand module elements 112 do not require being in an enclosure in some embodiments. Certain embodiments envision this checkout stand module 112 being supplied constant electrical power because this checkout stand module 112 embodiment is simply plugged into an electrical outlet. Other embodiments envision the checkout stand module 112 being powered by battery power.

Figure 4:
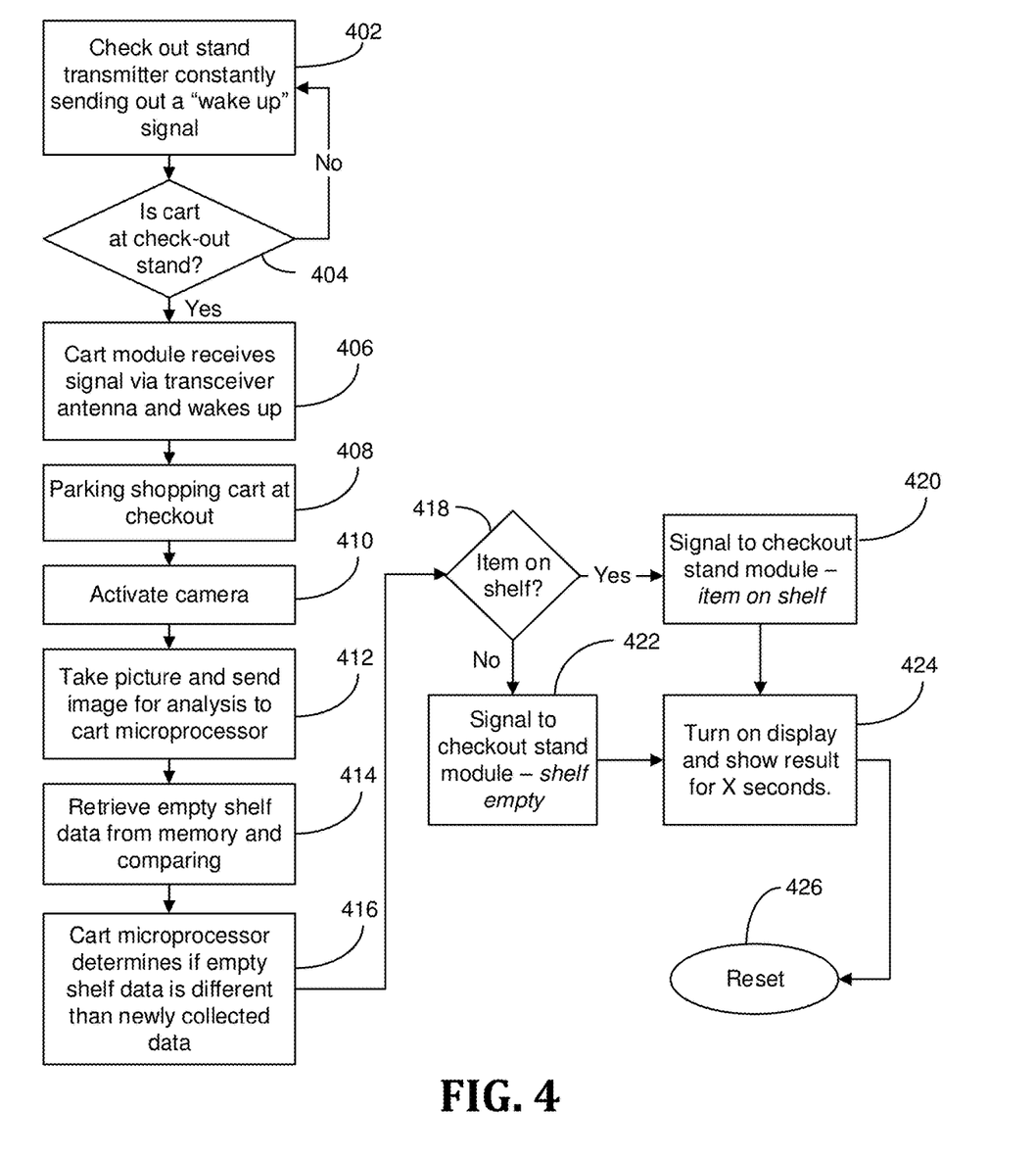
FIG. 4 is a block diagram illustrating method steps to the shopping cart and checkout stand operation consistent with embodiments of the present invention.

FIG. 4 is a block diagram illustrating method steps directed to shopping cart and checkout stand operations consistent with embodiments of the present invention. FIG. 4 is in view of FIGS. 1-3. The checkout stand power supply 302 powers the checkout stand module 112 to constantly transmit a "wake-up" signal through the checkout stand transceiver antenna 114, step 402. Some embodiments contemplate that the checkout stand module 112 going into detection mode, which is to transmit a "wake-up" signal for a second or less in intervals, such as every five or ten seconds for example to conserve power. Because the signal being transmitted by the checkout stand antenna 114 naturally attenuates as a function of distance from the antenna 114, certain embodiments contemplate adjusting the power of the signal to be powerful enough to "wake-up" the cart module 110 at a predefined distance (radius of the zone 130), step 404. Some embodiments contemplate the predefined distance to be a five foot radius, while others may be less than five feet, and yet others contemplate less than ten feet when the signal is strong enough to activate the cart module 110. This predefined distance radiates in directions determined by the type of antenna 114 and creates a zone referred to herein as an interrogation zone 130. An interrogation zone 130 is a zone in which communication/interrogation of the cart module 110 can occur, such as by a generic "cart reader" located by the checkout stand module 112, for example. Certain implementations of radiation pattern can be "directional" (as opposed to an omnidirectional pattern that radiates in all directions), which can be controlled by using an antenna that only primarily radiates "forward", for example. Hence, the zone can be focused only on the cart 100 and not towards another lane or elsewhere. This implementation is especially well suited for methods using an RFID cart reader. The predefined distance can be controlled to extend just enough to read the particular cart 100 at the checkout stand 120 to eliminate the possibility of reading other carts that may be in other checkout stands nearby. Assuming after an episode of shopping, the shopping cart 100 is wheeled, or otherwise pushed, into the interrogation zone 130, the cart module 110 "picks-up" (receives) the "wake-up" signal from the interrogation zone transceiver 304 thereby waking up the cart microprocessor 215, step 406. In this embodiment, the cart microprocessor 215 is in a "sleep" (or quiescent) mode when outside of an interrogation zone thereby preserving battery life by drawing low power from the battery 204. A skilled artisan will appreciate that the "sleep" mode can be configured to draw only power sufficient enough to "wake-up". In other words, waking-up is to become sufficiently active to control the normal activities of the cart module 110, such as data collection and communication transmission as described in conjunction with FIG. 4. Certain embodiments envision a woken up cart module 110 being essentially fully activated whereby the cart module 110 is functional to do all required tasks dictated by the programming routines (algorithms) maintained in or accessible to the cart module 110. It is further contemplated in some embodiments that the microprocessor 215 controls all functionality in the cart module 110, which in this case is accomplished by executing all relevant internal microprocessor functionality. Certain other embodiments contemplate the checkout stand 120 being configured to determine the presence of the shopping cart 100 in the interrogation zone 130 based on signal strength of the shopping cart transceiver 210. This can be accomplished by either providing some amount of constant power to the cart transceiver 210 or by powering-up the cart module 110 when entering the interrogation zone 130 thereby being sensed by the interrogation module 112. In the case where the shopping cart module 110 uses power from electromagnetic waves to induce electricity via inductive coupling using the antenna 212, such as when the shopping cart module is devoid of an on-board power supply, such as a battery, the microprocessor 215 is deprived of power and is essentially off unless the cart module 100 is inductively powered.

With continued reference to FIG. 4, step 408 contemplates an embodiment whereby the cart module 110 holds off further communication with the checkout stand module 112 until the shopping cart 100 essentially is parked at the checkout stand 120. Essentially parked is envisioned to mean stopped or nearly stopped, such as when items are being removed from the shopping cart 100 or are about to be removed from the shopping cart 100. Essentially parked can be evaluated by breaking a laser beam, photodiode, or some other location device. Other embodiments envision a timer managed by either the cart microprocessor 215 or the checkout stand microprocessor 306 which delays any further actions by the cart microprocessor 215 until a predetermined amount of time has passed since the shopping cart 100 passes into the interrogation zone 130. The predetermined amount of time assumes that the shopping cart 100 is essentially parked and can be controlled by the cart microprocessor 215 and more specifically the programs/routines 216 running/executing therein, step 408.

Once the shopping cart 100 is essentially parked at the checkout stand 120, the cart microprocessor 215 controls the digital imaging sensor 208 to take an optical image in the field of view 106 of the shelf 102, step 408. The digital image sensor/camera(s) 208 may have wide angle lenses, if needed, to create a field of view for the entire bottom shelf 102. Some embodiments envision using a digital camera in a way that obtains an image comprised by a matrix of pixels that each have a color and intensity number. At any rate, the image or processed data from the image is either retained in a temporary memory (not shown) or in the non-transient memory 214, but is otherwise analyzed to determine optical/light image related data (in the field of view 106 of the shelf 102) by the cart microprocessor 215 (or more specifically the programs/routines 216 running in the microprocessor 215), step 412. For purposes of simplicity, the analyzed optical/light image data in the field of view 106 of the shelf 102 at the checkout stand 120 will be referred to as the "second post processed shelf image". The term "image" herein is considered to include a variety of data from the image such as stored statistical data of the image (i.e. gray scale information average, mean, max, min, standard deviation, histogram scales), pixel counts (blob detection), line counts, edge counts, etc. Analyzed optical/light image data in the field of view 106 of the shelf 102 when empty, such as prior to shopping, retained in the non-transitory memory 214 will be referred to as the "first post processed shelf image". The first post processed shelf image, of the known empty shelf 102, is retrieved from the non-transitory memory 214 by the cart microprocessor 215 and compared with the second post processed shelf image by the cart microprocessor 215, step 414. One example of determining a baseline of an empty shelf 102 is to collect a first set of images based on predefined features of the shelf 102, such as a wire platform or some other basic features that may comprise the shelf 102. Some embodiments that leverage pixel data taken by the camera 208 may be processed and compared to processed pixel data of an empty cart shelf 102. Some processing methods may involve "lumping the pixel data together" and getting a single color or light intensity number. More sophisticated data processing methods such as edge detection may involve comparing the properties of neighboring pixels. There are many standard imaging processing methods that may be evaluated for optimal effectiveness for different types of carts. In some embodiments, image pixels outside the cart shelf 102 may be discarded. The stored data and algorithms might include doing an edge detection of the wires or grids, in the case where the bottom shelf 102 comprises wires or grids, followed by comparing an "edge detection" image of the bottom shelf 102 with a stored image of the wire shelf with no objects thereon, described in greater detail in conjunction with FIG. 5. The stored data and algorithms further include evaluating a shift in color or light intensity, described in further detail in conjunction with FIG. 6.

Certain embodiments contemplate the first post processed shelf image being obtained by the camera 208 automatically when the shopping cart 100 is known to be empty. Some embodiments contemplate taking the first post processed shelf image when the shopping cart 100 is moved into an initialization interrogation zone (not shown), such as when nestled with other shopping carts in a different part of a store or when passing through an entrance, just to name several examples. Once obtained, the first post processed shelf image is then stored to the non-transitory memory 214. The first post processed shelf image can be taken once and used thereon out, or optionally can be taken every time a shopping cart 100 is known to be empty and a) maintained as a most recent set of data alongside older images or b) replace previous renditions of first post processed shelf image. Some embodiments contemplate a recalibration schemes executed by a wireless command or a switch system comprised by the shopping cart 100 to set what defines an empty cart shelf 102.

Based on comparing the second post processed shelf image with the first post processed shelf image, the cart microprocessor 215 will determine if there is any change between the two sets of images, step 416. Block 418 is a decision step for whether or not the images are different, i.e., if there is at least one item 104 disposed on the shelf 102. If yes, signal to the checkout stand transceiver 304 via the cart transceiver 210 that there is at least one item 104 disposed on the shelf 102, step 420. Otherwise, if no, signal the checkout stand transceiver 104 that the shelf 102 is empty, step 422. During this process, certain embodiments contemplate that the checkout stand transceiver 304 is constantly listening 116 for data from the cart transceiver 210. Certain embodiments propose a simple binary 'yes' or 'no' signal to the checkout stand transceiver 104 to manage power and bandwidth communication. In other words, the cart wireless transmitter module 110 (that can require lots of battery power) is turned on for a very brief period of time, such as a few milliseconds, to transmit a small amount of data (0=shelf is empty, 1=shelf is not empty). In an embodiment using an RFID wireless interface, no power from the cart electronics module battery is used to transmit the data. Possible embodiments of wireless signals and other communication may include powered e-field transmitters, powered magnetic field transmitters, a battery-free or battery-assisted backscattering method (as used with RFID systems where the cart electronic module backscatters a magnetic or e-field signal), and non-radio systems such as light, infrared, or ultrasonic transmitters and receivers, just to name a few examples.

Once received, the checkout stand transceiver 304 transfers the results to the checkout stand processor 306, which in turn transmits a message to the display 125 whether or not an item is on the shelf 102, step 424. Some embodiments contemplate an alert system other than a display that displays a message, such as lights, sounds or a combination of other alert mechanisms known to those skilled in the art without departing from the scope and spirit of the present invention. Some embodiments contemplate the display monitor 125 will display the result for a predetermined amount of time, while other embodiments contemplate the display will reset upon completion of the transaction by the cashier, just to name several examples. Certain embodiments contemplate the result being stored in the checkout stand module memory 318. Other embodiments contemplate a serial number associated with the shopping cart 100 will also be transmitted along with the result and retained in memory 318. Some embodiments contemplate at least the second post processed shelf image being reset upon completion of the transaction by the cashier or when leaving the interrogation zone, for example, step 426. Other embodiments contemplate retaining a message in the nonvolatile cart memory 214 that the second post processed shelf image has already been used and is no longer valid. Yet other embodiments contemplate tagging the second post processed shelf image with an indexed number reflecting the number of times the shopping cart 100 has been interrogated at the checkout counter 120.

Figure 5A:
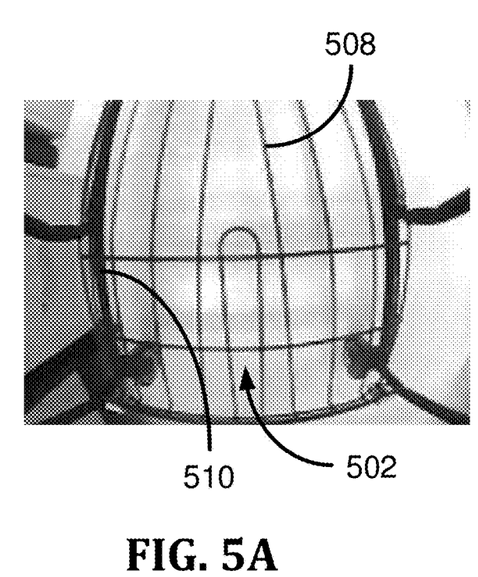
FIGS. 5A-5D depict photographic images of a shopping cart shelf and edge analysis thereof consistent with embodiments of the present invention.
Figure 5B:
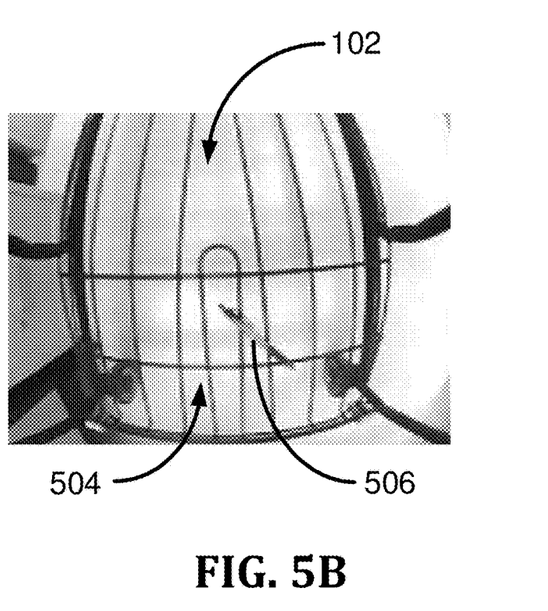
Figure 5C:
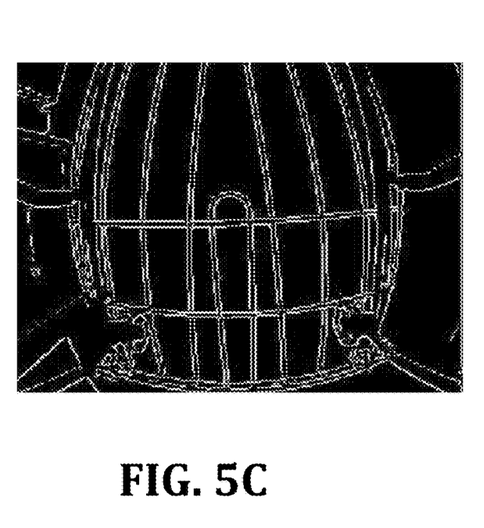
Figure 5D:
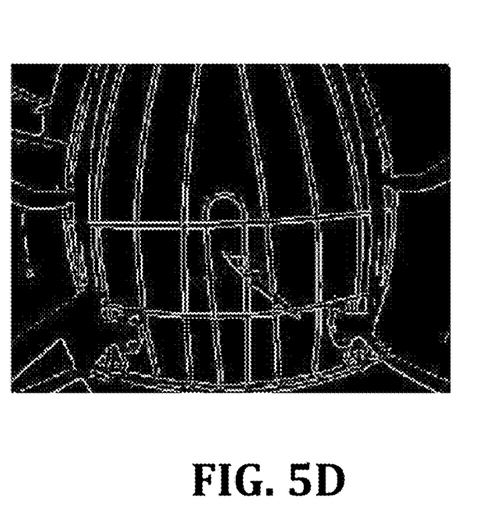

FIGS. 5A-5D depict photographic images of a shopping cart shelf and edge analysis thereof consistent with embodiments of the present invention. With respect to FIG. 5A, as shown by the actual gray-scale photograph, the shopping cart shelf 102 is generally comprised of a wire grid 508 that has no item thereon. FIG. 5C is an edge detection of the data from the image of FIG. 5A. In this example, the edge detection involves comparing the properties of neighboring pixels. There are many standard imaging processing methods that may be evaluated for their effectiveness in determining edge detection for different types of carts. In some embodiments, image pixels outside the cart shelf may be discarded, such as feet, checkered flooring, legs, etc. The stored data and algorithms might include doing an edge detection of the wires that comprise the bottom shelf and then comparing the "edge detection" image of the bottom shelf with a stored image of the wire shelf 508 with no objects on it. In addition, to avoid false positive detections when using a camera detector 208 when feet are under the shelf 102, the image processing algorithms could scan the cart edges 510 for feet-shapes that extend beyond the outer cart rail 510 and discard them to prevent customer feet from making an image appear that the bottom shelf 102 is not empty. Also, for example, by limiting the field of view only to pointing directly down or along the surface at the bottom shelf 102, consistent and reliable readings of the bottom shelf 102 can be compared to a stored data of an empty bottom shelf 102 to reliably determine if the bottom shelf 102 is empty. FIG. 5B illustratively depicts a gray-scale photograph of the same shopping cart shelf 102 as FIG. 5A, but with a pen 506 (item) resting on the shelf 102. FIG. 5D is an edge detection of the data from the image of FIG. 5B with the pen disposed on the shelf 102.

Figure 6A:
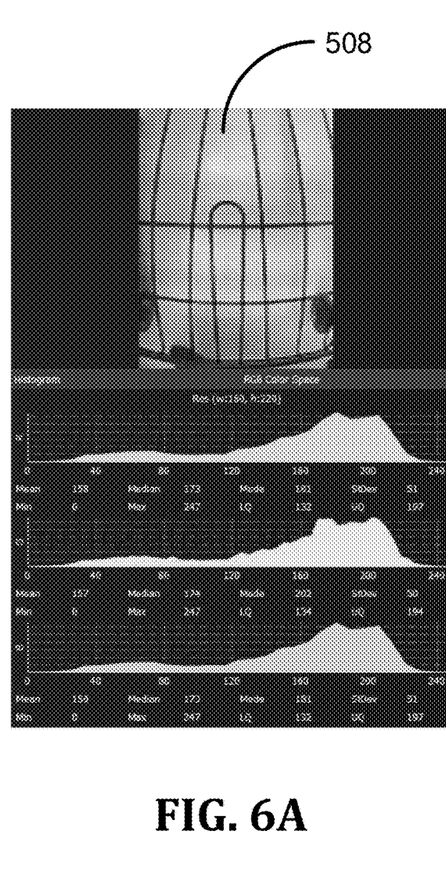
FIGS. 6A and 6B depict photographic images of a shopping cart shelf and color intensity consistent with embodiments of the present invention.
Figure 6B:
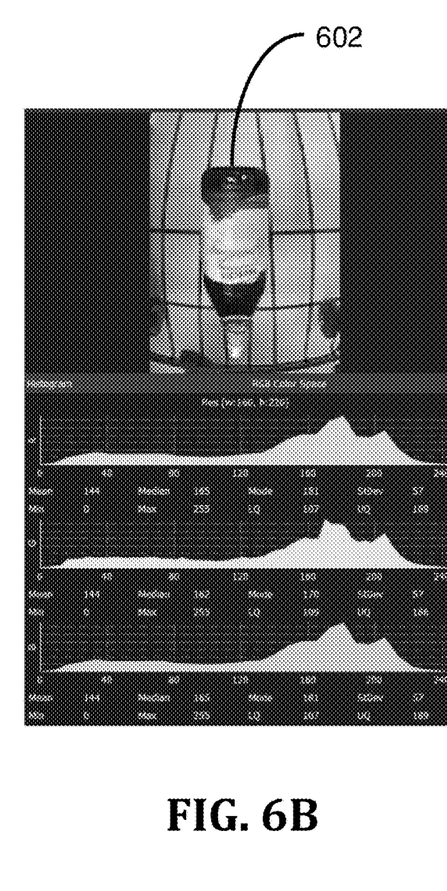

FIGS. 6A and 6B depict photographic images of a shopping cart shelf and color intensity consistent with embodiments of the present invention. With respect to FIG. 6A, as shown by the actual gray-scale photograph and the color intensity plots underneath the gray-scale photograph, the wire grid shopping cart shelf 102 has no item thereon. FIG. 6B has a bottle 602 (item) disposed on the shelf 102. Certain embodiments contemplate a low-power image processing detection algorithm compiling the intensity of each color (and gray scale) to the stored color intensity of an empty shelf 102, FIG. 6A. A shift in color or intensity is shown here to be a reliable method to determine if the shelf 102 is not empty. Another low-power detection method is to create a template where the wires in the shelf 102 are found and then reading the colors of the wires. When an object, e.g., the bottle 602, is place on the wire shelf 102, a change in color where the wire is expected to be seen will reliably determine if the shelf 102 is empty, or not. Another method includes using other standard image processing methods that detect a change in the image that an object on the shelf 102 causes.

Visual light image sensors/cameras provide benefits over distance measuring sensors in that visual light detectors and cameras are well known technologies with significant engineering advances and options both in the hardware and software. In other words, visual light detectors and cameras are considerably more mature than distance measuring technology providing far more options for analysis and techniques used as well as cost advantages.

Figure 7:
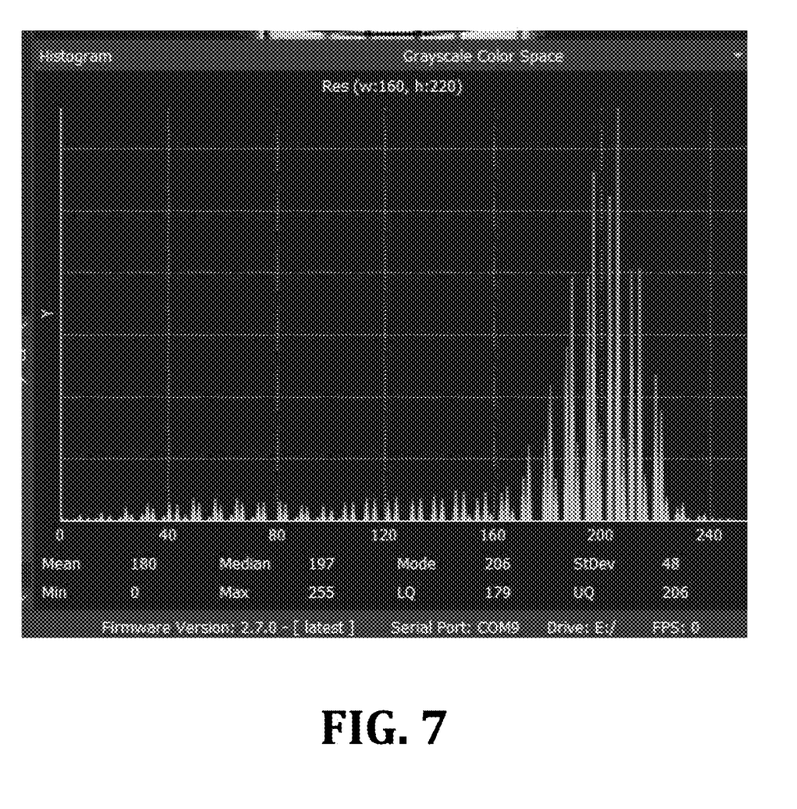
FIG. 7 depicts a grey scale intensity histogram plot using histogram analysis consistent with embodiments of the present invention.

FIG. 7 depicts a grey scale intensity histogram plot whereby an image with an item or without an item are compared using histogram analysis consistent with embodiments of the present invention.

With the present description in mind, below is a summary of some embodiments consistent with the present invention. The elements called out below are examples provided to assist in the understanding of the present invention and should not be considered limiting.

Certain embodiments envision a shopping cart comprising: a basket; a shelf connected to the basket, the shelf located under the basket and spaced sufficiently under the basket to support at least one item; at least one visual light camera sensor (hereinafter "camera") connected to the shopping cart, the shelf in a field of view of the camera; a power supply connected to and adapted and configured to power the camera; a shopping cart transceiver connected to and adapted to be powered by the power supply, the shopping cart transceiver comprises an antenna and wireless communications circuit; and a microprocessor, powered by the power supply and connected to the shopping cart transceiver, configured to become fully activated when in an interrogation zone of an interrogation zone transceiver, the microprocessor configured to determine the presence of the item by comparing second data from a second image of the shelf with the item against first image data from a first image of the shelf without the item, the first image and the second image obtained by the camera, the first data retained in non-transitory memory accessible to the microprocessor, the shopping cart transceiver configured to transmit the presence of the item supported by the shelf to the interrogation zone transceiver.

The shopping cart embodiment further contemplating wherein the interrogation zone transceiver is connected to a monitor at a checkout stand that is configured to display the presence of the item disposed on the shelf.

The shopping cart embodiment further pondering wherein the interrogation zone is within 5 feet of a checkout stand.

The shopping cart embodiment further envisioning wherein the shopping cart transceiver and the interrogation zone transceiver are configured to communicate wirelessly.

The shopping cart embodiment further imagining wherein the microprocessor, powered by the power supply, is configured to determine when the shelf is empty, or not empty, by comparing third data from a third image of the shelf that no longer has the item when in the interrogation zone against the first data. The shopping cart transceiver can further be configured to transmit the shelf is empty to the interrogation zone transceiver, the interrogation zone transceiver connected to a means for communicating that the shelf is empty, such as a light, audible alarm, displayed message on a display screen, etc.

The shopping cart embodiment further considering wherein the interrogation zone transceiver is located at a checkout stand. The interrogation zone can be defined by the presence of a magnetic field or a radio field strong enough to induce a voltage in the antenna comprised by the shopping cart transceiver, the voltage configured to wake-up the microprocessor from a low-power quiescent state to being fully activated.

The shopping cart embodiment further contemplating wherein the camera and the shopping cart transceiver are adapted and configured to become powered by the microprocessor when it becomes fully activated.

The shopping cart embodiment further pondering wherein the interrogation zone transceiver is adapted and configured to transmit the presence of the item supported by the shelf to a network of other devices.

The shopping cart embodiment further envisioning wherein the shopping cart transceiver is configured to further transmit an ID number along with either an indication that the item is on the shelf or that the shelf is empty.

The shopping cart embodiment further imagining wherein the shopping cart is adapted and configured to receive data from the interrogation zone transceiver and adapted and configured to store the data to the non-transient memory. The data can include the number of times the shopping cart passes through a checkout stand over a set period of time.

The shopping cart embodiment further contemplating wherein the first data and the second data are based on a grey scale intensity using histogram analysis.

The shopping cart embodiment further considering wherein the first data and the second data are based on predefined features of the shelf.

The shopping cart embodiment further musing wherein the first data in the non-volatile memory is adapted and configured to be retaken via a recalibration routine executed by the microprocessor. The recalibration scheme can be initiated at a storage location of the shopping cart when the shelf is empty. Optionally, the recalibration routine can be configured to be executed by a wireless command or a switch system comprised by the shopping cart.

The shopping cart embodiment further visualizing wherein the checkout stand is configured to determine the presence of the shopping cart in the interrogation zone based on signal strength of the shopping cart transceiver.

The shopping cart embodiment further envisaging wherein the camera is integrated in metal tubing or structural component comprised by the shopping cart.

The shopping cart embodiment further contemplating wherein the camera is integrated in the structure of the shopping cart.

The shopping cart embodiment further pondering wherein the first data and the second data are based on color intensity spectrum from at least one color.

The shopping cart embodiment further imagining wherein the first data and the second data are based on edge detection of predefined features of the shelf.

The shopping cart embodiment further musing wherein the first data and the second data are each a color intensity compilation of all of the pixels that comprise either the first data or the second data.

The shopping cart embodiment further envisioning wherein the first image and the second image are produced from light falling in the nonvisible light spectrum.

The shopping cart embodiment further visualizing wherein the first image and the second image are produced from light falling in the visible light spectrum.

The shopping cart embodiment further imagining wherein the power supply is the antenna that provides induced electricity from radio waves when in the interrogation zone.

A method embodiment contemplates comprising: providing a shopping cart that possesses a basket, a shelf connected to and located under the basket, a microprocessor, a camera, non-transitory memory, and a shopping cart transceiver; collecting first data from a first optical image of the shelf when empty via the camera; storing the first data to the non-transitory memory; collecting second data from a second optical image of the shelf via the camera when within an interrogation zone; comparing the second data with the first data retained in the non-transitory memory; determining a status of whether there is at least one item disposed on the shelf from the comparing step, the status is either an empty status indicating no item disposed on the shelf or a full status indicating at least one item disposed on the shelf; and transmitting the status to an alert system.

The method embodiment further envisioning wherein the microprocessor controls the camera, the non-transitory memory, a power supply, and the shopping cart transceiver.

The method embodiment further imagining wherein the collecting the first optical image is accomplished when the microprocessor is in an active state defined by controlling functionality and power to the camera, the non-transitory memory, and the shopping cart transceiver as well as executing all relevant internal microprocessor functionality. Some embodiments contemplate further comprising transitioning the microprocessor in a sleep state defined by low-power consuming condition. In one option, the transitioning step can occur after the storing step. The collecting the first optical image can be completed at a shopping cart holding area, in yet another example. In yet an additional embodiment, the non-transitory memory can be cleared of at least the second data when in the shopping cart holding area. In an additional embodiment the antenna of the shopping cart transceiver can be energized when the shopping cart is moved within the predetermined distance of the checkout station. The microprocessor can be woken up from the sleep state to the active state when sensing the energizing of the antenna. In one option, the collecting the second optical image step occurs after the waking up step. Other possibilities further contemplate comprising providing notice at the checkout station of the status wherein the notice can be visually displayed via a display device. The display device can be selected from a group comprising a light and a monitor.

The method embodiment further musing wherein the interrogation zone is a checkout station.

The method embodiment further pondering wherein the collecting the second data step, the comparing step, and the determining step are accomplished by power supplied to the microprocessor, the camera, the non-transitory memory, and a shopping cart transceiver. The power supplied can a battery system on the shopping cart. Optionally, the power supplied can be from electromagnetic waves powerful enough to induce an electrical current in an antenna at the shopping cart transceiver.

Yet another method embodiment contemplates: providing a shopping cart that includes a basket, a shelf connected to and located under the basket, a microprocessor, a camera, non-transitory memory, a power supply, and a shopping cart transceiver, the microprocessor controlling the camera, the non-transitory memory, the power supply, and the shopping cart transceiver; with the microprocessor in an active state, collecting a first optical image of the shelf when empty via the camera, the active state defined by controlling functionality and power to the camera, the non-transitory memory, and the shopping cart transceiver as well as executing all relevant internal microprocessor functionality; storing the first data of the first optical image to the non-transitory memory; transitioning the microprocessor in a sleep state defined by a low-power consuming condition after the storing step; the shopping cart transceiver receiving a wireless signal when in an interrogation zone produced by a checkout station transceiver; waking up the microprocessor from the sleep state to the active state; collecting a second optical image of the shelf via the camera when within the interrogation zone after the waking up step; comparing second data from the second optical image with the first data retained in the non-transitory memory via the microprocessor; determining a status of whether there is at least one item disposed on the shelf from the comparing step, the status is either an empty status indicating no item disposed on the shelf or a full status indicating at least one item disposed on the shelf; transmitting the status to a checkout station; and providing notice at the checkout station of the status.

The above embodiments are not intended to be limiting to the scope of the invention whatsoever because many more embodiments are easily conceived within the teachings and scope of the instant specification. Moreover, the corresponding elements in the above example should not be considered limiting.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though aspects of the present invention depict visual cameras using edge sensors and light intensity, other techniques or visual cameras could equally be used while still maintaining substantially the same functionality without departing from the scope and spirit of the present invention. Another example is using a single module for the shopping cart and a single module for the checkout stand, however multiple modules can be used equally while still maintaining substantially the same functionality without departing from the scope and spirit of the present invention. Yet another example is the alert system is a display and display message, however an alert system can include lights, sounds or a combination of other alert mechanisms known to those skilled in the art without departing from the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A shopping cart comprising:
  a basket;
  a shelf connected to the basket, the shelf located under the basket and spaced sufficiently under the basket to support at least one item;
  at least one visual light camera sensor (hereinafter "camera") connected to the shopping cart, the shelf in a field of view of the at least one camera;
  a power supply connected to and adapted to power the at least one camera;
  a shopping cart transceiver connected to and adapted to be powered by the power supply, the shopping cart transceiver comprises an antenna and wireless communications circuit; and
  a microprocessor, powered by the power supply and connected to the shopping cart transceiver, configured to become fully activated when in an interrogation zone of an interrogation zone transceiver, the microprocessor configured to determine the presence of the item by comparing second data from a second image of the shelf with the item against first image data from a first image of the shelf without the item, the first image and the second image obtained by the at least one camera, the first data retained in non-transitory memory accessible to the microprocessor, the shopping cart transceiver configured to transmit the presence of the at least one item supported by the shelf to the interrogation zone transceiver,
  the shopping cart transceiver and the interrogation zone transceiver are configured to communicate wirelessly, the interrogation zone transceiver is in a location that is independent from the shopping cart.

2. The shopping cart of claim 1 wherein the microprocessor, powered by the power supply, is configured to determine when the shelf is empty by comparing third data from a third image of the shelf devoid of the item when in the interrogation zone against the first data.

3. The shopping cart of claim 1 wherein the interrogation zone transceiver is located at a checkout stand.

4. The shopping cart of claim 3 wherein the interrogation zone defined by the presence of a magnetic field or a radio field strong enough to induce a voltage in the antenna comprised by the shopping cart transceiver, the voltage adapted to wake-up the microprocessor from a low-power quiescent state to being fully activated.

5. The shopping cart of claim 1 wherein the at least one camera and the shopping cart transceiver are adapted to become powered by the microprocessor when it becomes fully activated from a quiescent power state.

6. The shopping cart of claim 1 wherein the interrogation zone transceiver is adapted to transmit the presence of the item supported by the shelf to a network of other devices.

7. The shopping cart of claim 1 wherein the shopping cart transceiver is configured to further transmit an ID number along with either an indication that the item is on the shelf or that the shelf is empty.

8. The shopping cart of claim 1 wherein the first data and the second data are based on a grey scale intensity using histogram analysis.

9. The shopping cart of claim 1 wherein the first data and the second data are based on predefined features of the shelf.

10. The shopping cart of claim 1 wherein the first data in the non-volatile memory is adapted to be retaken via a recalibration routine executed by the microprocessor, the recalibration scheme is initiated at a storage location of the shopping cart when the shelf is empty.

11. The shopping cart of claim 1 wherein the checkout stand is configured to determine the presence of the shopping cart in the interrogation zone based on signal strength of the shopping cart transceiver.

12. The shopping cart of claim 1 wherein the first data and the second data are based on color intensity spectrum from at least one color.

13. The shopping cart of claim 1 wherein the first data and the second data are based on edge detection of predefined features of the shelf.

14. A method comprising:
  providing a shopping cart that possesses a basket, a shelf connected to and located under the basket, a microprocessor, a camera, non-transitory memory, and a shopping cart transceiver;
  collecting first data from a first optical image of the shelf when empty via the camera;
  storing the first data to the non-transitory memory;
  energizing the antenna of the shopping cart transceiver when the shopping cart is moved within a predetermined distance of the checkout station, the predetermined distance defining an interrogation zone;

collecting second data from a second optical image of the shelf via the camera when within the interrogation zone;

comparing the second data with the first data retained in the non-transitory memory;

determining a status of whether there is at least one item disposed on the shelf from the comparing step, the status is either an empty status indicating no item disposed on the shelf or a full status indicating at least one item disposed on the shelf; and transmitting the status to an alert system.

15. The method of claim 14 wherein the collecting the first optical image is accomplished when the microprocessor is in an active state defined by controlling functionality and power to the camera, the non-transitory memory, and the shopping cart transceiver as well as executing all relevant internal microprocessor functionality.

16. The method of claim 15 further comprising transitioning the microprocessor in a sleep state defined by low-power consuming condition.

17. The method of claim 16 wherein the collecting the first optical image is completed at a shopping cart holding area.

18. A method comprising:

providing a shopping cart that includes a basket, a shelf connected to and located under the basket, a microprocessor, a camera, non-transitory memory, a power supply, and a shopping cart transceiver, the microprocessor controlling the camera, the non-transitory memory, and the shopping cart transceiver powered by the power supply;

with the microprocessor in an active state, collecting a first optical image of the shelf when empty via the camera, the active state defined by controlling functionality and power to the camera, the non-transitory memory, and the shopping cart transceiver as well as executing all relevant internal microprocessor functionality;

storing the first data of the first optical image to the non-transitory memory;

transitioning the microprocessor in a sleep state defined by a low-power consuming condition after the storing step;

the shopping cart transceiver receiving a wireless signal when in an interrogation zone produced by a checkout station transceiver while in the sleep state;

waking up the microprocessor from the sleep state to the active state via the wireless signal;

collecting a second optical image of the shelf via the camera when within the interrogation zone after the waking up step;

comparing second data from the second optical image with the first data retained in the non-transitory memory via the microprocessor;

determining a status of whether there is at least one item disposed on the shelf from the comparing step, the status is either an empty status indicating no item disposed on the shelf or a full status indicating at least one item disposed on the shelf;

transmitting the status to a checkout station; and providing notice at the checkout station of the status.

* * * * *